(12) United States Patent
Chen (10) Patent No.: US 11,192,486 B2
(45) Date of Patent: Dec. 7, 2021

(54) CUP HOLDER FOR A VEHICLE WITH WIRELESS CHARGING CAPABILITY

(71) Applicant: Ningbo Motorman E-commerce Co., Ltd., Ningbo (CN)

(72) Inventor: Weizhen Chen, Ningbo (CN)

(73) Assignee: Ningbo Motorman E-commerce Co., Ltd., Ningbo (CN)

( * ) Notice: Subject to any disclaimer, the term of this patent is extended or adjusted under 35 U.S.C. 154(b) by 216 days.

(21) Appl. No.: 16/412,557

(22) Filed: May 15, 2019

(65) Prior Publication Data

US 2020/0361355 A1 Nov. 19, 2020

(51) Int. Cl.
*H02J 7/00* (2006.01)
*B60N 3/10* (2006.01)
*H02J 7/02* (2016.01)
*B60R 16/03* (2006.01)

(52) U.S. Cl.
CPC .............. *B60N 3/103* (2013.01); *B60R 16/03* (2013.01); *H02J 7/0045* (2013.01); *H02J 7/025* (2013.01)

(58) Field of Classification Search
USPC ................................................. 320/106–115
See application file for complete search history.

(56) References Cited

U.S. PATENT DOCUMENTS

| D687,017 S | 7/2013 | Ashcraft |
| D744,541 S | 12/2015 | Langhammer et al. |
| 2014/0361627 A1* | 12/2014 | Kurs ....................... H02J 50/50 307/104 |
| 2016/0365747 A1* | 12/2016 | Redding ................. H02J 7/045 |
| 2018/0001835 A1* | 1/2018 | Corso ..................... H04M 1/04 |

* cited by examiner

*Primary Examiner* — Binh C Tat
(74) *Attorney, Agent, or Firm* — Craft Chu PLLC; Andrew W. Chu (57) ABSTRACT

The vehicle-mounted cup holder with a wireless charging function includes a shell. The shell is formed with a cup holding body and a mobile phone accommodating chamber. The mobile phone accommodating chamber includes a mobile phone supporting face that is forward inclined, and both sides of the mobile phone supporting face bend upwards so as to respectively form a side board. Electricity supply coils are tightly fixed on the lower end of the mobile phone supporting face, and the electricity supply coils are electrically connected with a circuit board mounted in the shell. The circuit board is provided with a power supply input wire. A side wall of the shell is provided with one or more charging ports connected with the circuit board.

10 Claims, 7 Drawing Sheets

CUP HOLDER FOR A VEHICLE WITH WIRELESS CHARGING CAPABILITY

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a vehicle-mounted cup holder, and specifically to a vehicle-mounted cup holder with a wireless charging function.

2. Description of Related Art Including Information Disclosed Under 37 CFR 1.97 and 37 CFR 1.98

In modern society, automobile has become an irreplaceable means of transportation in people's daily life. With the development of technology, there are more and more kinds and models of cars with more and more complete functions. People also have higher requirements for practicality and comfort of automobile interior decoration. As an important practical part in automobile, cup holder has become the standard part of every automobile. A traditional cup holder usually sits between the driver's seat and the co-pilot's seat. Meanwhile, with the popularity of mobile phones, the use of mobile phones is taking up an increasing proportion of the time, and thus it is necessary to ensure that mobile phones have sufficient power. In vehicles, cigarette lighter and data line are usually used together to charge a mobile phone, which has poor appearance and poor cleanliness. Meanwhile, data lines winding will interrupt the normal driving operations of the driver, which has certain potential safety hazards. Vehicle-mounted wireless chargers, such as vehicle-mounted wireless chargers disclosed in patent application No. 201721810008.X, are already available (disclosed). However, most of them use a clamp-on structure (mobile phone stand structure), and the external stand located in the operating table needs to be powered from the cigarette lighter via an exposed power line. Then, the power line located on the driver's platform affects the appearance, and has some safety hazards. Moreover, such kind of charger is inconvenient to operate and can only charge the mobile phone with wireless charging function, which has great limitations.

BRIEF SUMMARY OF THE INVENTION

The Technical Problem Sought to be Solved

The technical problem to be solved by the invention is to provide a vehicle-mounted cup holder with a wireless charging function that is simple and compact in structure, has a wide range of application, and is convenient to be used.

The Technical Solution Applied to Solve Such Technical Problem

The present invention provides a vehicle-mounted cup holder with a wireless charging function.

There is a shell 3, wherein the shell is formed with a cup holding body for accommodating a cup and a mobile phone accommodating chamber for accommodating a mobile phone. The cup holding body is located at the front of the shell, and the cup holding body is formed with a cup accommodating cavity that is exposed on the top. The lower end of the cup holding body extends downwards and forms a mounting member 11. The mobile phone accommodating chamber comprises a mobile phone or inclined supporting face 21 that is forward inclined, and both sides 21A of the mobile phone or inclined supporting face 21 bend upwards so as to respectively form side boards 21E. The electricity supply coil 32 or coils are tightly fixed on the lower end 21B of the mobile phone supporting face, and the electricity supply coils are electrically connected with a circuit board 33 mounted in the shell. The circuit board is provided with a power supply input wire, and the power supply input wire passes through the shell and is connected to a plug. A side wall (upper shell side wall 2A) of the shell is provided with one or more charging ports 30 connected with the circuit board.

Further, the upper surface 21C of the mobile phone or inclined supporting face 21 concaves inwards so as to form a groove 21F, and a subplate 31 for contacting the mobile phone is tightly fixed in the groove.

Further, the subplate is made of an elastic material, and skidproof stripes 31A are arranged on the surface of the subplate.

Further, the lower surface 21D of the mobile phone or inclined supporting face 21 is arranged with a round mounting groove wall 210, and the electricity supply coils are mounted in the round mounting groove wall 210.

Further, the lower surface 21D of the mobile phone or inclined supporting face 21 is provided with a convex plat 21H, and the round mounting groove is arranged on the convex plat; the depth of the round mounting groove is larger than the height of the convex plat.

Further, the shell comprises a lower shell portion 1 and an upper shell portion 2. There is a lower shell rear end 1E, and there is a lower shell front end 1D of the lower shell portion that concaves downwards in order to form a mounting member 11 having a round cross section A cup accommodating cavity that is exposed on the top is formed in the mounting member. The upper shell front end 2D of the upper shell portion is provided with an upper shell cup mouth 204 corresponding to the cup accommodating cavity. The upper shell rear end 2E of the upper shell portion is provided with an oblique plane, and the oblique plane concaves inwards so as to form the mobile phone accommodating chamber, and the rear end of the mobile phone accommodating chamber extends along its length direction to the outside of the upper shell portion. An installation chamber 4 is formed between the mobile phone accommodating chamber and the lower shell portion, and the circuit board is securely mounted in the installation chamber.

Further, the shell comprises an upper shell portion 1 and a lower shell portion 2. The upper shell rim 2B of the upper shell portion is provided with an annular or upper shell positioning groove 2C, and the lower shell rim 1B of the lower shell portion is provided with an annular or lower shell positioning projection 1C that can be clamped into the annular or upper shell positioning groove An inner side of the upper shell rim of the upper shell portion or lower shell rim of the lower shell portion is provided with a guide plate 201, and the plane in which the guide plate 201 is located is perpendicular to the lower shell side wall 1A or the upper shell side wall 2A or both. The guide plate 201 or guide plates can be located on either the lower shell portion 1 or the upper shell portion 2 or both. The guide plate is arranged with an oblique guide face or an arc-shaped guide face.

Further, the cup accommodating cavity comprises an opening end 200 located at the top and an accommodating end located at the bottom; the opening end is cylindrical, and the accommodating end 100 has a frustum cone shape that is bigger at the top and smaller at the bottom; the inner diameter of the opening end is larger than the largest inner diameter at the top of the accommodating end.

Further, strip-type grooves 111 are uniformly distributed at the circumference of the outer wall of the mounting member.

Further, the lower end of the mobile phone supporting face is provided with a backstop face for contacting an end of the mobile phone, and the backstop face is provided with a cushion layer.

Advantageous Effects

The vehicle-mounted cup holder with a wireless charging function provided by the present invention is simple and compact in structure, can be quickly installed in a car cup hole, can be easily and quickly installed, and has high strength as well as a compact and high aesthetic appearance; also, it makes the mobile phone easy to be placed and grabbed, can charge multiple mobile phones at the same time, and can realize both cable charging and wireless charging; further, it has good versatility and a wide range of application, and is suitable for all kinds of vehicle models.

DETAILED DESCRIPTION OF THE INVENTION

In the following, specific implements of this invention are described in detail.

Figure 1:
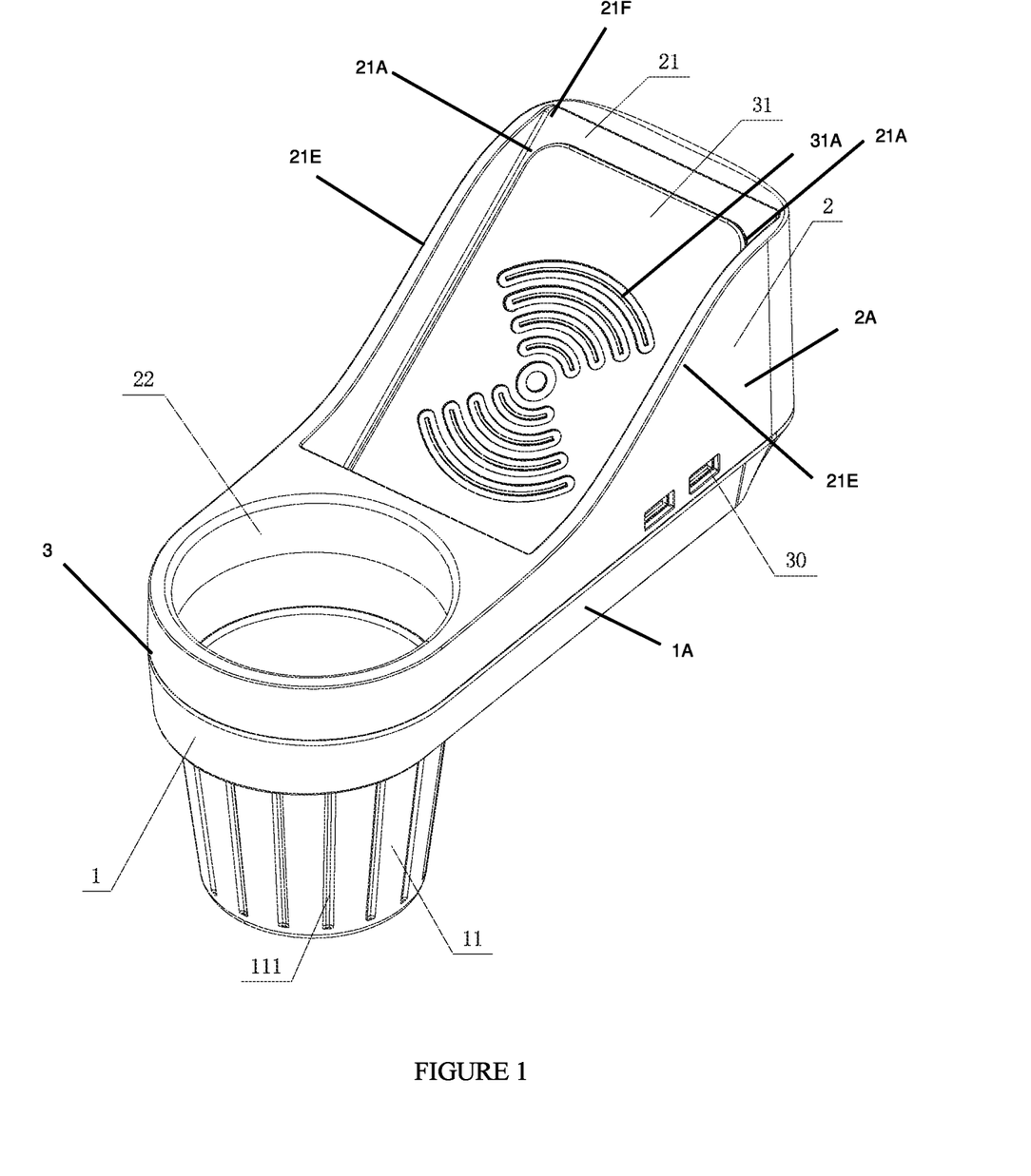
FIG. 1 is a schematic view of structural diagram of the vehicle-mounted cup holder with a wireless charging function provided by the present invention.
Figure 2:
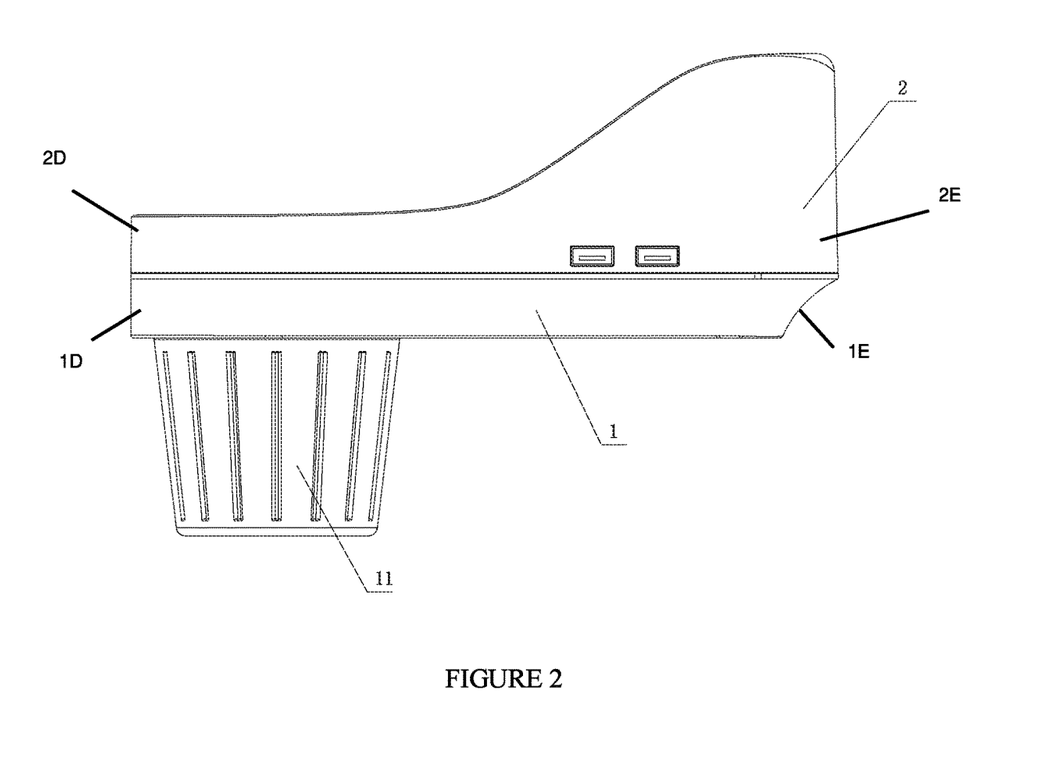
FIG. 2 is a side schematic view of the vehicle-mounted cup holder with a wireless charging function provided by the present invention.
Figure 3:
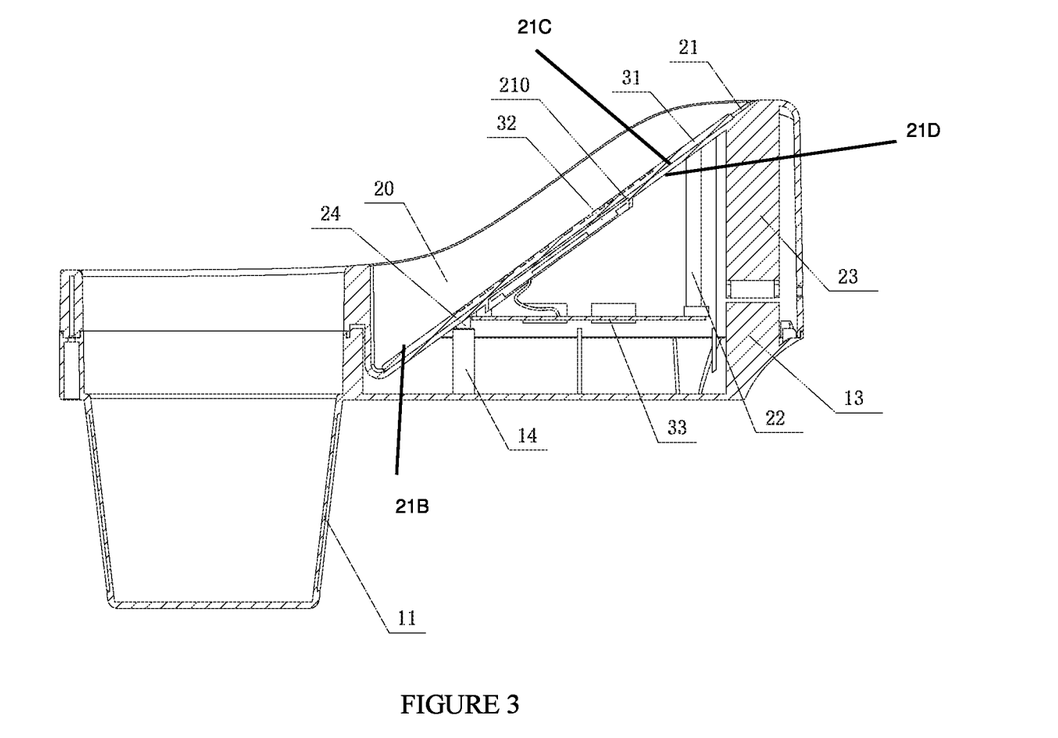
FIG. 3 is a sectional view of the vehicle-mounted cup holder with a wireless charging function provided by the present invention.
Figure 4:
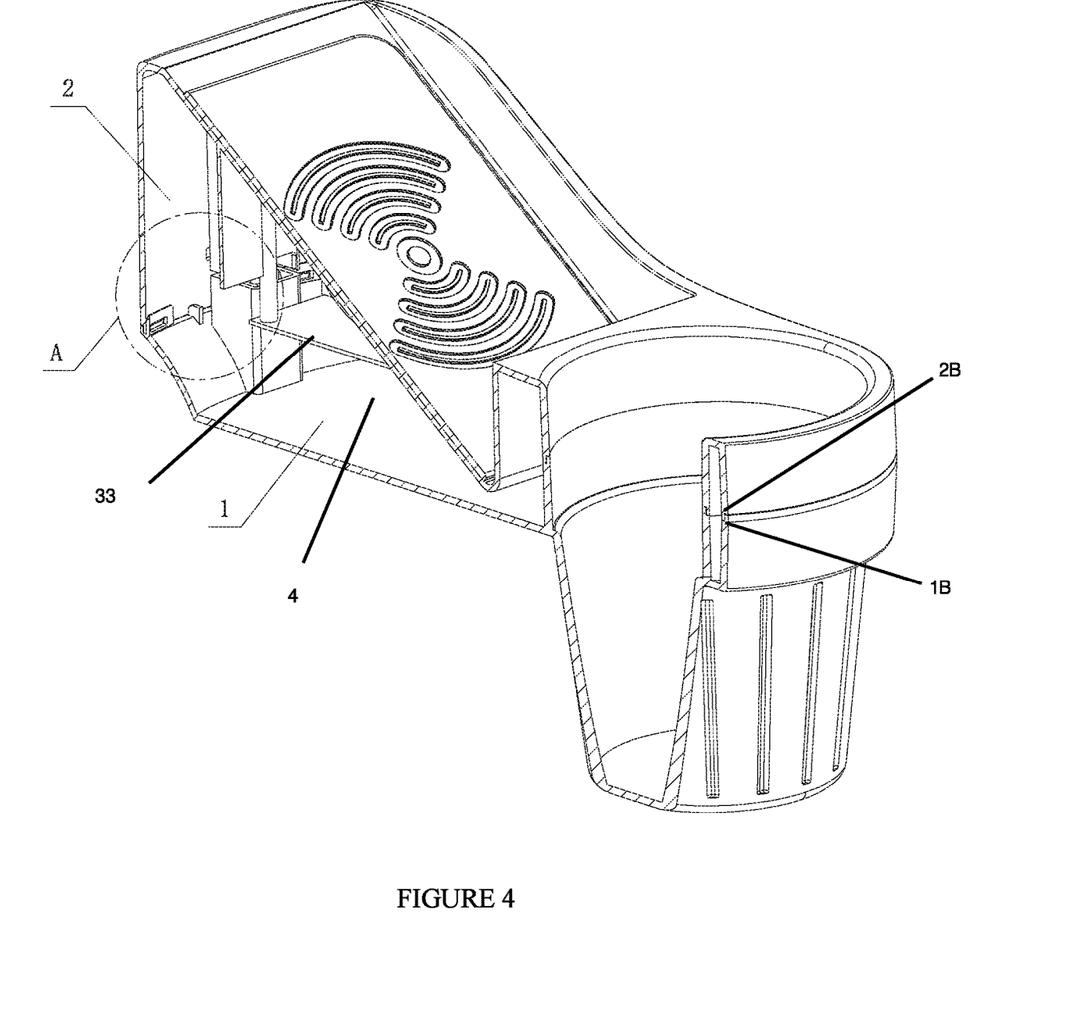
FIG. 4 is a partial sectional and perspective view of an internal structure diagram of the vehicle-mounted cup holder with a wireless charging function provided by the present invention.
Figure 5:
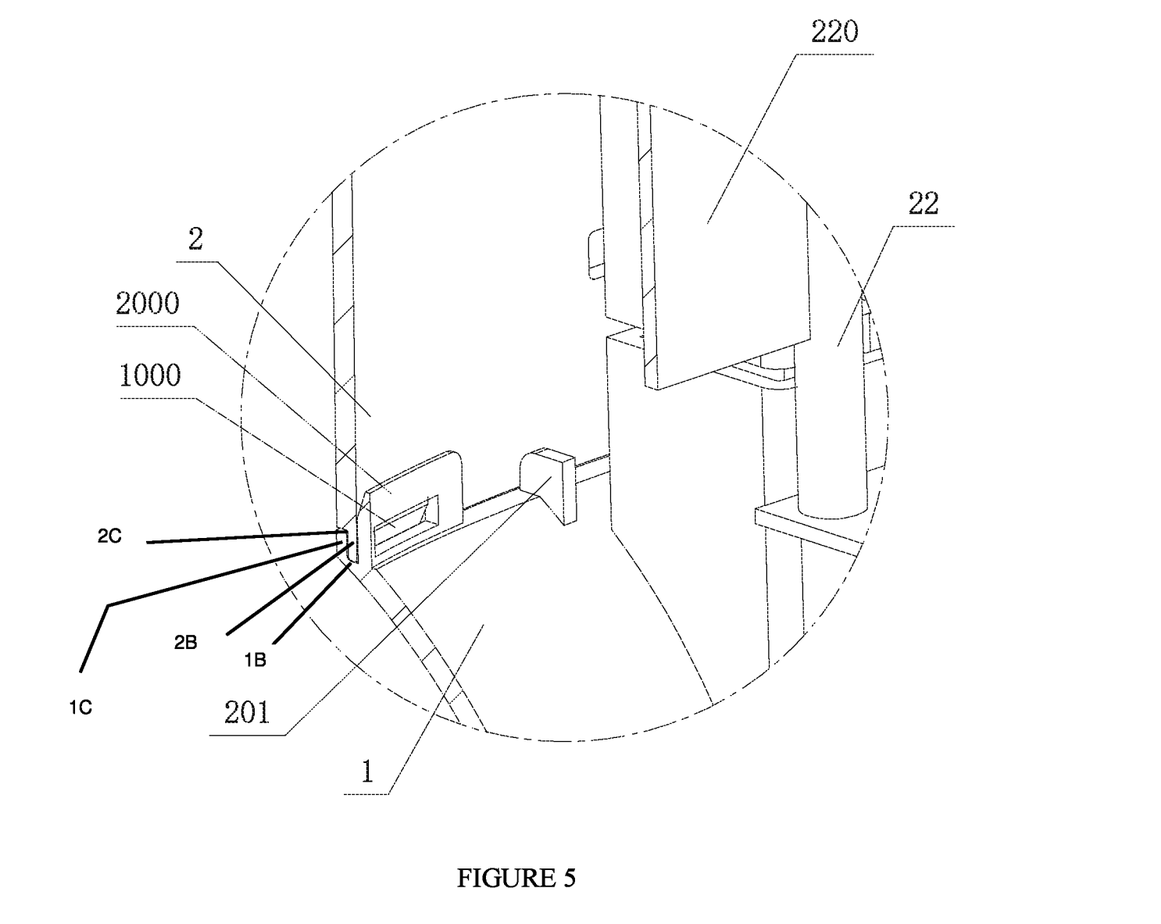
FIG. 5 is an enlarged schematic view of a drawing of portion A of FIG. 4.
Figure 6:
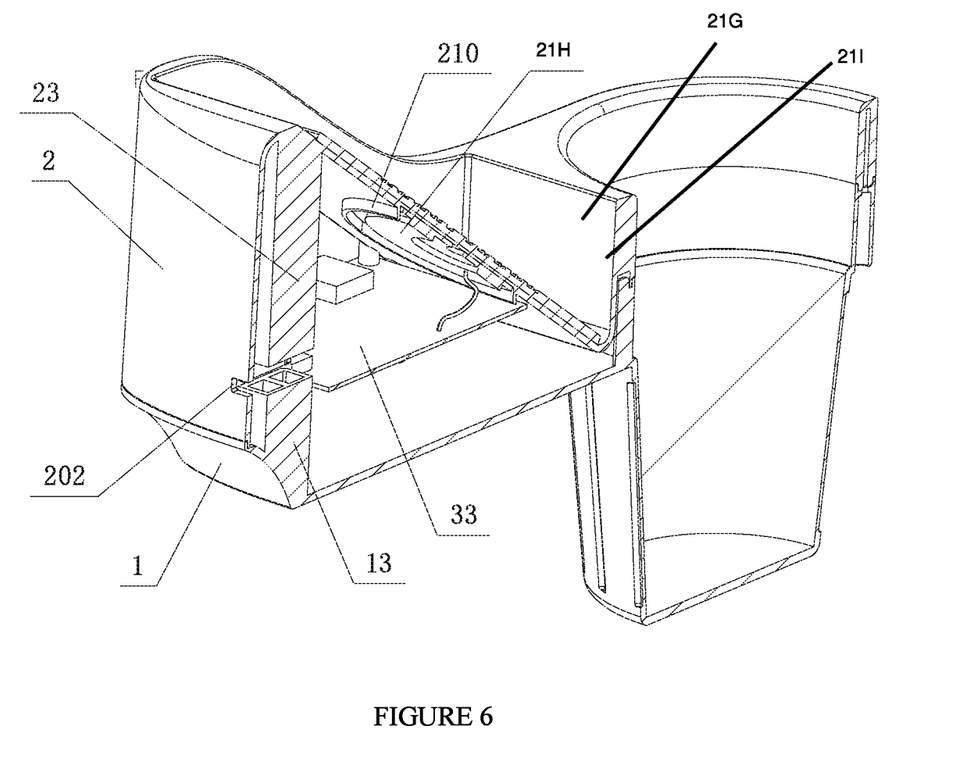
FIG. 6 is another partial sectional and perspective view of an installation diagram of the electricity supply coils of the vehicle-mounted cup holder with a wireless charging function provided by the present invention.
Figure 7:
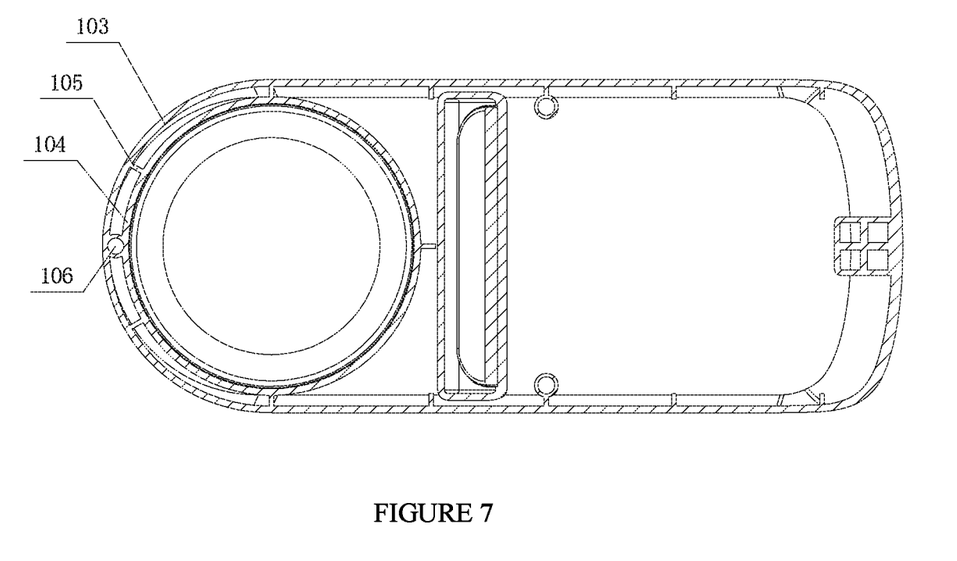
FIG. 7 is a transverse sectional view of the vehicle-mounted cup holder with a wireless charging function provided by the present invention.
Figure 8:
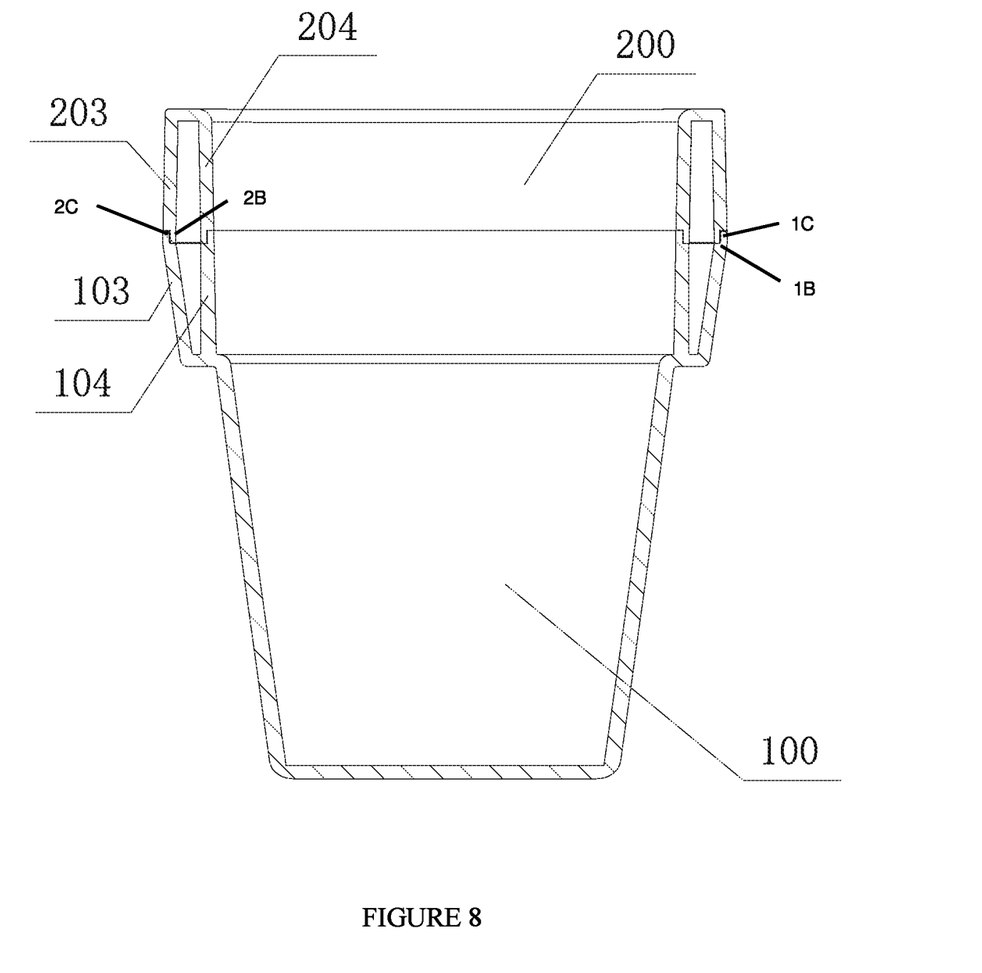
FIG. 8 is a schematic view of structural diagram of the cup accommodating cavity of the vehicle-mounted cup holder with a wireless charging function provided by the present invention.

Referring to FIGS. 1-8, the present invention provides a vehicle-mounted cup holder with a wireless charging function, which can be quickly and securely installed in a vehicle cup hole. Specifically, such vehicle-mounted cup holder comprises a shell, wherein the shell is formed with a cup holding body for accommodating a cup and a mobile phone accommodating chamber (opening) for accommodating a mobile phone. The cup holding body is located at the front of the shell, and the cup holding body is formed with a cup accommodating cavity that is exposed on the top. In this embodiment, the cup accommodating cavity comprises an opening end 200 located at the top and an accommodating end 100 located at the bottom. Wherein, the opening end is cylindrical, thus having a uniform bore diameter from top to bottom. The accommodating end has a frustum cone shape that is bigger at the top and smaller at the bottom, whose bore diameter gradually decreases from top to bottom. In this embodiment, angle between the side wall and axis of the accommodating end is in a range of 5-10 degrees. The inner diameter of the opening end is larger than the largest inner diameter at the upper end (top) of the accommodating end, and diameter difference between these two is larger than 1 mm and smaller than 5 mm. Thus, a small stepped face is formed at the connecting area between the opening end and the accommodating end, and such stepped face transits to the inner wall of the accommodating end via an arc-shaped face, thus facilitating the placing of the cup. Further, in order to improve the stability of the placing of the cup, a ratio of the height (depth) of the opening end to the height (depth) of the receiving cavity is in a range of ⅓-½. In order to further improve the stability of the placing of the cup, a adjusting mechanism (not shown in the Figures) is arranged in the cup accommodating cavity, and such adjusting mechanism can be mounted on the accommodating end, the opening end or side walls of both the accommodating end and the opening end. Specifically, such adjusting mechanism comprises at least two adjusting blocks uniformly arranged circumferentially.

Examples of the form of adjusting blocks are as follows:

Type One: The upper end of the adjusting block is rotationally hinged on the side wall of t the cup accommodating cavity, and its rotational axis is perpendicular to the axis of the cup accommodating cavity. The upper end of the adjusting block is an arc-shaped surface or an inclined surface, and the end of the adjusting block is an arc-shaped groove for contacting the side wall of the cup body. An elastic part is arranged between the adjusting block and the side wall of the cup body placement hole, and the elastic part makes the lower end of the adjusting block have a tendency to move upward. Under the action of spring force, every adjusting block moves to an upper limit position. When the cup is placed, under the action of the gravity of the cup, the lower end of the cup body is in contact with the arc-shaped or inclined surface on the adjusting block so as to push the adjusting block to overcome the spring force and to rotate, so that the cup will completely enter into the placing cavity; meanwhile, under the action of the spring force, the round groove on the adjusting block is in contact with the side wall of the cup body, and the cup body is clamped under the action of the elastic force. The structure can improve the stability of the cup, avoid the collision and noise in the process of driving, improve the driving comfort, and adapt to different diameters of the cup body. When the vehicle brakes or when a collision occurs, under the action of inertial force, the cup body produces thrust to the adjusting block; under the action of spring force, the adjusting block produces a certain buffering force to avoid rigid impact and improve safety.

Type Two: The adjusting block slides along the radius direction to and is engaged with the side wall of the cup accommodating cavity; and its sliding direction is vertical and intersects the axis of the cavity on the cup body, and its sliding direction is perpendicular to the axis of the cup accommodating cavity. The upper end of the adjusting block is an arc-shaped surface or an inclined surface, and the end of the adjusting block is an arc-shaped groove for contacting the side wall of the cup body. An elastic part is arranged between the adjusting block and the side wall of the cup body placement hole, and the elastic part makes the lower end of the adjusting block have a tendency to move toward the center of a circle. Under the action of spring force, every adjusting block moves to an inner limit position (closest to the axis of the cup accommodating cavity). When the cup is placed, under the action of the gravity of the cup, the lower end of the cup body is in contact with the arc-shaped or inclined surface on the adjusting block so as to push the adjusting block to overcome the spring force and to move, so that the cup will completely enter into the placing cavity; meanwhile, under the action of the spring force, the round groove on the adjusting block is in contact with the side wall of the cup body, and the cup body is clamped under the action of the elastic force. The structure can improve the stability of the cup, avoid the collision and noise in the process of driving, improve the driving comfort, and adapt to different diameters of the cup body. When the vehicle brakes or when a collision occurs, under the action of inertial force, the cup body produces thrust to the adjusting block; under the action of spring force, the adjusting block produces a certain buffering force to avoid rigid impact and improve safety.

Type Three: The adjusting block is an arc-shaped elastic sheet with certain elasticity. The length direction of the elastic sheet is parallel to the axis of the cup accommodating cavity, and the middle convex side of the elastic sheet is toward the axis of the accommodating cavity. When the cup is placed, under the action of the gravity of the cup, the lower end of the cup body is in contact with the arc-shaped elastic sheet so as to elastically deform the arc-shaped elastic sheet, so that the cup will completely enter into the placing cavity; meanwhile, under the action of the elastic force of the arc-shaped elastic sheet, the arc-shaped elastic sheet is in contact with the side wall of the cup body and the cup body is clamped tightly. The structure can improve the stability of the cup, avoid the collision and noise in the process of driving, improve the driving comfort, and adapt to different diameters of the cup body. When the vehicle brakes or when a collision occurs, under the action of inertial force, the cup body produces thrust to the arc-shaped elastic sheet; under the action of elastic force, the arc-shaped elastic sheet produces a certain buffering force to avoid rigid impact and improve safety.

The lower shell front end 1D of the cup holding body extends downwards and forms a mounting member 11. The mounting member has a frustum cone shape as a whole, and its outer wall is slightly tapered, thus enabling the quick installation into the cup hole of the car. The cup accommodating cavity is arranged on the mounting member. Strip-type grooves 111 are uniformly distributed at the circumference of the outer wall of the mounting member, which can improve the overall structural strength. The mobile phone accommodating chamber comprises a mobile phone or inclined supporting face 21 that is forward inclined, and both sides 21A of the mobile phone supporting face bend upwards so as to respectively form side boards 21E. Electricity supply coils 32 are tightly fixed on the lower end 21B of the lower surface 21D of the mobile phone supporting face. The lower surface 21D of the mobile phone supporting face is provided with a round convex plat 21H, and a round mounting groove wall 21G or 210 is arranged on an end face of the round convex plat. Also, the depth of the round mounting groove wall 21G or 210 is larger than the height of the convex plat, and the difference between these two is between 0.5-2 mm. The electricity supply coils or coil is installed in the round mounting groove wall. The electricity supply coils are electrically connected with a circuit board 33 mounted in the shell. The circuit board is provided with a power supply input wire, and the power supply input wire passes through the shell and is connected to a plug. This plug is a cigarette lighter plug, for power supply. A side wall (upper shell side wall 2A) of the shell is provided with one or more charging ports 30 connected with the circuit board. The charging ports may be USB interfaces that have 5V output voltages for charging mobile devices through the data lines. If the mobile phone supports wireless charging, then the mobile phone is placed on an oblique plane and is charged wirelessly. When the mobile phone does not support wireless charging, power is obtained from the charging interface through a data line so that the mobile phone can be charged, and the mobile phone can be placed on the oblique plane when it is being charged. In order to improve the usability, the upper surface 21C of the mobile phone or inclined supporting face 21 concaves inwards so as to form a groove 21F, and a subplate 31 for contacting the mobile phone is tightly fixed in the groove 21F. The subplate may be made of an elastic material, which can avoid damaging the phone by the impact caused when the phone is placed. Skidproof stripes 31A are arranged on the surface of the subplate. In this embodiment, the skidproof stripes 31A are a wireless charging identification similar to a wifi signal identification.

Specifically, the shell 3 of the vehicle-mounted cup holder provided by the present invention comprises a lower shell portion 1 and an upper shell portion 2. The lower shell front end 1D of the lower shell portion concaves downwards in order to form a mounting member 11 having a round cross section. The mounting member as a whole has a frustum cone shape that is bigger at the top and smaller at the bottom. A cup accommodating cavity that is exposed on the top is formed with the mounting member, the lower shell cup mouth 104, and an upper shell cup mouth 204, which is the open end of the cup accommodating cavity. The lower shell cup mouth 104 is circular as a whole. Also, the upper shell front end 2D of the upper shell portion is provided with the upper shell cup mouth 204 that is corresponding to the lower shell cup mouth 104 of the cup accommodating cavity. The lower shell cup mouth 104 and the upper shell cup mouth 204 have the same aperture, and are both ring-shaped. The upper face of the lower shell cup mouth I is provided with a first ring-shaped groove, and the lower end of the upper shell cup mouth II is provided with a first ring-shaped projection corresponding to the first ring-shaped groove.

During assembly procedure, the first ring-shaped projection is clamped into the first ring-shaped groove, and the lower shell cup mouth 104 and the upper shell cup mouth 204 form an opening end of the cup accommodating cavity. In this embodiment, the first ring-shaped groove is located at the outer edge of the the lower shell cup mouth 104, and the first ring-shaped projection is located at the inner edge of the upper shell cup mouth 204. At the lower shell front end 1D of the lower shell portion, there is a first or lower arc-shaped face 103 that is coaxial with the lower shell cup mouth 104; and at the upper shell front end 2D of the upper shell portion, there is a second or upper arc-shaped face 203 that is coaxial with the upper shell cup mouth 204. The upper arc-shaped face 203 and the lower arc-shaped face 103 are relatively positioned and fixed via the upper shell rim 2B with the upper shell positioning groove 2C and the lower shell rim 1B with the lower shell positioning projection 1C.

A screw used for fastening is provided between the ring-shaped cup mouths (the cup mouth I and the cup mouth II) and arc-shaped faces (the first and second arc-shaped faces) of the shell. A junction plate is provided between the outer wall of the cup mouth I and the inner wall of the arc-shaped face at the front of the lower shell portion, for improving the structural strength. Also, a junction plate is provided between the outer wall of the cup mouth II and the inner wall of the arc-shaped face at the front of the upper shell portion. The rear end of the upper shell portion is provided with an oblique plane, and such oblique plane is inwards arranged (a direction towards the cup accommodating cavity), and an angle between the oblique plane and the horizontal plane is between 35 and 50 degrees. The oblique plane concaves inwards so as to form the mobile phone accommodating chamber, and the rear end of the mobile phone accommodating chamber extends backwards along its length direction (of the mobile phone accommodating chamber) to the outside of the upper shell portion.

The lower end 21B of the mobile phone or inclined supporting face 21 is provided with a backstop face 21G for contacting an end of the mobile phone, and the backstop face is provided with a cushion layer 21I. An installation chamber 4 is formed between the mobile phone accommodating chamber and the lower shell portion, and the installation chamber is located at the lower end of the mobile phone accommodating chamber. The circuit board is securely mounted in the installation chamber. Specifically, the lower end face of the upper shell portion is provided with several cylindrical circuit board mounting columns 22, and the circuit board is fixed onto the circuit board mounting columns via screws. In order to improve the structural stability and reliability, a junction plate 220 is provided between the circuit board mounting columns and the side wall of the upper shell portion, so as to improve the structural strength of the circuit board mounting columns. The rim of the upper shell portion is provided with an annular positioning groove, and the rim of the lower shell portion is provided with an annular positioning projection that can be clamped into the annular positioning groove.

To improve assembly efficiency, an inner side of the rim of the upper shell portion or the lower shell portion is provided with several guide plates 201, and the plane in which the guide plates are located is perpendicular to the sidewall of the upper shell portion or the lower shell portion. The guide plate is arranged with an oblique guide face or an arc-shaped guide face. During assembly procedure, the inner wall of the upper shell portion or the lower shell portion is contacted with the oblique guide face (arc-shaped guide face) of the guide plate, and move along the oblique guide face (arc-shaped guide face), so that edges of the upper shell portion and the lower shell portion can be quickly positioned, and meanwhile the grooves and projections at the contacting faces between the upper shell portion and the lower shell portion enable accurate positioning. The inner wall of the lower shell portion is provided with a snap joint 1000, and the inner wall of the upper shell portion is provided with a card slot 2000. The snap joint is clamped into the card slot in order to complete the fixation.

Further, the upper shell portion and the lower shell portion are connected via screws. Specifically, the upper shell portion is provided with an upper mounting column 24, and the lower shell portion is provided with a lower mounting column 14 that a screw can pass through. The lower mounting column and the upper mounting column are coaxial and form a mounting member.

Moreover, to improve positioning accuracy, the upper face of the lower mounting column is provided with a positioning concave hole that the upper mounting column can be snapped in. An end of the upper mounting column is provided with a chamfering or bevel angle, for fast insertion into the positioning concave hole. An end of the upper mounting column is provided with a screw hole, and the lower mounting column is provided with a stepped bore. The stepped bore is used for the mounting of a screw. The mounting members (the lower mounting column and the upper mounting column) are plural and are set along the shell contour; thus, some of them are arranged between the cup mouth and arc-shaped faces of the shell. A reinforcement column or reinforcement pole 23, 13 is provided in the installation chamber, for improving the structural strength.

At the rear end of the shell, the bottom face and the rear end face are connected by an arc-shaped surface that concaves inwards. The rear end of the shell is provided with a cable hole that power supply wire can pass through. In order to improve the sealing and to extend the service life, a seal ring is provided at the contact area between the upper shell portion and the lower shell portion, and charging port and cable hole are both provided with a rubber plug.

Such Wireless charging module comprises an AC/DC converter, a frequency converter connected to the AC/DC converter and electricity supply coils connected to the frequency converter. The AC/DC converter and the frequency converter is integrated on the circuit board, and the electricity supply coils are electrically connected to the frequency converter on the circuit board. The mobile phone is provided with receiving coils corresponding to the electricity supply coils. The receiving coils generate alternating current by receiving power from electricity supply coils, and the alternating current is rectified through a rectifier circuit and then is transmitted to the cell phone battery.

In order to improve the functions, a heating or cooling device can be provided on the inner wall of the cup base, and a shielding cover can be provided on the device to reduce signal interference.

The vehicle-mounted cup holder with a wireless charging function provided by the present invention is simple and compact in structure, can be quickly installed in a car cup hole, can be easily and quickly installed, and has high strength as well as a compact and high aesthetic appearance; also, it makes the mobile phone easy to be placed and grabbed, can charge multiple mobile phones at the same time, and can realize both cable charging and wireless charging; further, it has good versatility and a wide range of application, and is suitable for all kinds of vehicle models.

Above descriptions are only some preferred embodiments of the present invention. It is to be understood that, as for a person skilled in the art, modifications and alternatives that are made according to the principle of the present utility model application all fall into the scope of the present invention.

I claim:

1. A vehicle-mounted cup holder with a wireless charging function, the holder comprising:
 a shell comprising:
  an upper shell portion having an upper shell front end and an upper shell rear end opposite said upper shell front end,
 wherein said upper shell portion is comprised of:
 an upper shell side wall;
 an upper shell cup mouth at said upper shell front end; and
 an inclined supporting face with opposing sides, a lower end, an upper surface and a lower surface opposite said upper surface,
 wherein said upper shell side wall at said upper shell front end is comprised of an upper arc shaped face, and
 wherein said upper shell side wall is extended above said inclined supporting face on said opposing sides so as to form side boards;
  a lower shell portion having a lower shell front end and a lower shell rear end opposite said lower shell front end,
 wherein said lower shell portion is comprised of:
 a lower shell side wall;
 a lower shell cup mouth at said lower shell front end; and
 a mounting member with a round cross-section,
 wherein said lower shell side wall at said lower shell front end is comprised of a lower arc shaped face; and
  a guide plate perpendicular to said lower shell side wall;
 an electricity supply coil fixed on said lower end of said inclined supporting face; and
 a circuit board electrically connected to said electricity supply coils,
 wherein said upper shell side wall is comprised of a charging port connected to said circuit board,
 wherein said upper shell cup mouth, said lower shell cup mouth and said mounting member form a cup holding body,
 wherein said cup holding body has a cup accommodating cavity with an opening end at said upper shell cup mouth and an accommodating end at said mounting member,
 wherein said inclined supporting face and said side boards form a mobile phone accommodating chamber,
 wherein said upper arc shaped face is removably connected to said lower arc shaped face,
 wherein said upper shell cup mouth is removably connected to said lower shell cup mouth,
 wherein said upper arc shaped face and said lower arc shaped face have adjustable positions relative to said upper shell cup mouth and said lower shell cup mouth, and
 wherein said lower end of said inclined supporting face is below said upper arc shaped face and said upper shell cup mouth.

2. The holder, according to claim 1, further comprising:
 a groove on said upper surface of said inclined supporting face; and
 a subplate fixed in said groove.

3. The holder, according to claim 2, wherein said subplate is comprised of elastic material, and wherein said subplate has skidproof stripes.

4. The holder, according to claim 1, further comprising:
 a round mounting groove wall on said lower surface of said inclined supporting face, wherein said electricity supply coil is mounted within said round mounting groove wall.

5. The holder, according to claim 4, further comprising:
 a convex plat on said lower surface of said inclined supporting face, wherein said round mounting groove wall has a height greater than said convex plat, and wherein said electricity supply coil is mounted between said round mounting groove wall and said convex plat.

6. The holder, according to claim 1, wherein said inclined supporting face is on said upper shell rear end so as to form an installation chamber with said upper shell rear end and said lower shell rear end, and wherein said circuit board is mounted in said installation chamber.

7. The holder, according to claim 1, wherein said upper shell portion is further comprised of an upper shell rim with an upper shell positioning groove, and wherein said lower shell portion is further comprised of a lower shell rim with a lower shell positioning projection so as to removable connect said upper shell portion to said lower shell portion.

8. The holder, according to claim 1, wherein said opening is cylindrical, wherein said accommodating end is frusto-conical, and wherein an inner diameter of said opening is larger than an inner diameter of said accommodating end.

9. The holder, according to claim 1, wherein said mounting member is comprised of grooves.

10. The holder, according to claim 1, wherein said upper shell portion is further comprised of a backstop face at said lower end of said inclined supporting face with a cushion layer.

* * * * *